(12) United States Patent
Hachisuka

(10) Patent No.: US 8,130,473 B2
(45) Date of Patent: Mar. 6, 2012

(54) MULTI-CHANNEL THIN-FILM MAGNETIC HEAD AND MAGNETIC TAPE DRIVE APPARATUS WITH THE MULTI-CHANNEL THIN-FILM MAGNETIC HEAD

(75) Inventor: Nozomu Hachisuka, Tokyo (JP)

(73) Assignee: TDK Corporation, Tokyo (JP)

( * ) Notice: Subject to any disclaimer, the term of this patent is extended or adjusted under 35 U.S.C. 154(b) by 654 days.

(21) Appl. No.: 12/261,563

(22) Filed: Oct. 30, 2008

(65) Prior Publication Data
US 2010/0110582 A1    May 6, 2010

(51) Int. Cl.
G11B 5/39 (2006.01)
G11B 5/29 (2006.01)
G11B 5/40 (2006.01)

(52) U.S. Cl. .......... 360/316; 360/319; 360/323

(58) Field of Classification Search .......... 360/316, 360/323, 319
See application file for complete search history.

(56) References Cited

U.S. PATENT DOCUMENTS

| | | | |
|---|---|---|---|
| 5,539,598 A * | 7/1996 | Denison et al. .......... 360/323 |
| 5,805,390 A | 9/1998 | Takeura |
| 6,246,553 B1 | 6/2001 | Biskeborn |
| 6,400,534 B1 | 6/2002 | Klaassen |
| 6,671,137 B2 | 12/2003 | Ajiki et al. |
| 6,704,174 B2 | 3/2004 | Soda et al. |
| 6,972,930 B1 | 12/2005 | Tang et al. |
| 7,392,579 B2 | 7/2008 | Leung et al. |
| 7,400,474 B2 * | 7/2008 | Biskeborn et al. .......... 360/323 |
| 7,486,476 B2 * | 2/2009 | Biskeborn .......... 360/121 |
| 7,591,064 B2 * | 9/2009 | McFadyen .......... 29/603.12 |
| 7,773,347 B2 * | 8/2010 | Maejima et al. .......... 360/316 |
| 7,933,098 B2 * | 4/2011 | Otsuka et al. .......... 360/294.7 |
| 2007/0133130 A1 * | 6/2007 | Biskeborn .......... 360/323 |
| 2007/0133131 A1 * | 6/2007 | Biskeborn .......... 360/323 |
| 2007/0230062 A1 * | 10/2007 | Maejima et al. .......... 360/316 |
| 2008/0259504 A1 * | 10/2008 | Biskeborn .......... 360/319 |
| 2009/0080121 A1 * | 3/2009 | Biskeborn .......... 360/319 |
| 2009/0180216 A1 * | 7/2009 | Golcher et al. .......... 360/323 |

\* cited by examiner

Primary Examiner — Will J Klimowicz
(74) Attorney, Agent, or Firm — Oliff & Berridge, PLC

(57) ABSTRACT

A multi-channel thin-film magnetic head includes a substrate, a plurality of MR read head elements, a plurality of first resistive elements, and a second resistive element. Each MR read head element includes a lower magnetic shield layer, an upper magnetic shield layer, and an MR layer arranged between the lower magnetic shield layer and the upper magnetic shield layer. Each first resistive element has a first resistance value. One ends of the first resistive elements are connected to the lower magnetic shield layers or the upper magnetic shield layers of the MR read head elements, respectively. The second resistive element has a second resistance value that is higher than the first resistance value. One end of the second resistive element is commonly connected to the other ends of the plurality of first resistive elements. The other end of the second resistive element is grounded.

10 Claims, 6 Drawing Sheets

MULTI-CHANNEL THIN-FILM MAGNETIC HEAD AND MAGNETIC TAPE DRIVE APPARATUS WITH THE MULTI-CHANNEL THIN-FILM MAGNETIC HEAD

BACKGROUND OF THE INVENTION

1. Field of the Invention

The present invention relates to a multi-channel thin-film magnetic head, and to a multi-channel magnetic tape drive apparatus with the multi-channel thin-film magnetic head.

2. Description of the Related Art

In the multi-channel magnetic tape drive apparatus, a multi-channel thin-film magnetic head with read head elements and write head elements for a large number of channels is provided. For example, in the multi-channel magnetic tape drive apparatus (the fourth generation) with the LTO (linear tape open) technical standard, a multi-channel thin-film magnetic head provided with read head elements of 16 channels, write head elements of 16 channels and servo magnetic head elements of 2 channels is used.

Recently, with enhancement in the performance of the multi-channel magnetic tape drive apparatus, required is adoption of high performance multi-channel thin film magnetic head. Thus, an inductive write head element is used as the write head element of each channel and also a giant magnetoresistive effect (GMR) read head element is put to practical use as the read head element of each channel, and demand for high output read head element becomes more increased.

The GMR read head element is compatible with high recording density and can provide high output, but because of low withstand voltage, it is easy to receive electrical destruction. Thus, a magnetic disk drive apparatus with one or more thin-film magnetic heads each having a single GMR read head element is designed such that electrical charge in the head element is gradually discharged to a substrate via a high-resistance shunt formed between the GMR read head element and the substrate. However, because the multi-channel thin film magnetic head for multi-channel magnetic tape drive apparatus has a plurality of GMR read head elements, the electric charge may flow to the neighboring GMR read head element before it discharges to the substrate through the high-resistance shunt. Particularly, in recent years, because head element separation of the multi-channel thin-film magnetic head becomes narrower and its shield space between adjacent head elements becomes approximately 1 µm, the possibility of occurring of discharge between the shields of the adjacent head elements becomes higher.

SUMMARY OF THE INVENTION

It is therefore an object of the present invention to provide a multi-channel thin-film magnetic head and a multi-channel magnetic tape drive apparatus, whereby influence of electrical discharge between adjacent head elements can be reduced.

According to the present invention, a multi-channel thin-film magnetic head includes a substrate, a plurality of magnetoresistive effect (MR) read head elements, a plurality of first resistive elements, and a plurality of second resistive elements. Each MR read head element includes a lower magnetic shield layer, an upper magnetic shield layer, and an MR layer arranged between the lower magnetic shield layer and the upper magnetic shield layer. Each first resistive element has a first resistance value. One ends of the plurality of first resistive elements are connected to the lower magnetic shield layers or the upper magnetic shield layers of the plurality of MR read head elements, respectively. Each second resistive element has a second resistance value that is higher than the first resistance value. One ends of the plurality of second resistive elements are commonly connected to the other ends of the plurality of first resistive elements. The other ends of the plurality of second resistive elements are grounded.

One of the lower magnetic shield layer and the upper magnetic shield layer of each MR read head element is grounded through a resistance structure formed by serially connecting the first resistive element and the second resistive element (its resistance value=first resistance value+second resistance value). Thus, charge in the magnetic shield layer is gradually discharged to the ground. On the other hands, the lower magnetic shield layers or the upper magnetic shield layers of the adjacent MR read head elements re connected each other through a resistance structure formed by serially connecting two first resistive elements (its resistance value=first resistance value×2). Thus, no potential difference of a predetermined value or more will be produced between these adjacent MR read head elements. Also, incorporation of noise from one MR read head element to another MR read head element adjacent thereto will never occur.

It is preferred that the substrate is grounded through a third resistive element having a third resistance value that corresponds to a sum of the first resistance value and the second resistance value.

It is also preferred that the lower magnetic shield layer and the upper magnetic shield layer of each of the plurality of MR read head elements are connected each other through a fourth resistive element with a fourth resistance value that corresponds to a sum of the first resistance value and the second resistance value.

It is further preferred that each of the plurality of MR read head elements includes a GMR read head element.

It is still further preferred that the multi-channel thin-film magnetic head further includes a plurality of inductive write head elements.

According to the present invention, also, a multi-channel magnetic tape drive apparatus includes the above-mentioned multi-channel thin-film magnetic head, a magnetic tape facing to the multi-channel thin-film magnetic head, and a drive system for relatively moving the magnetic tape and the multi-channel thin-film magnetic head.

Further objects and advantages of the present invention will be apparent from the following description of the preferred embodiments of the invention as illustrated in the accompanying drawings.

DESCRIPTION OF THE PREFERRED EMBODIMENTS

Figure 1:
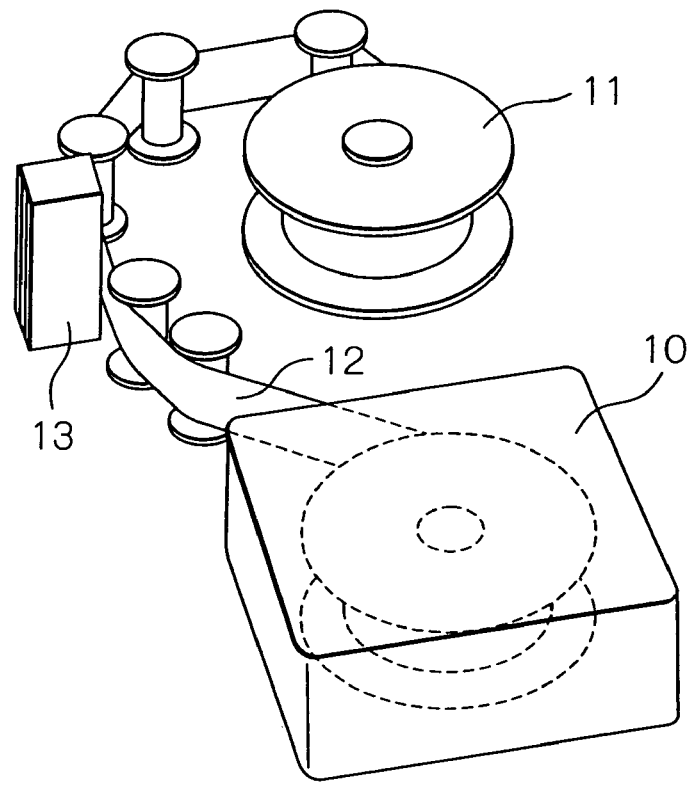
FIG. 1 is a perspective view schematically illustrating constitution of a multi-channel magnetic tape drive apparatus as a one embodiment according to the present invention.
Figure 2:
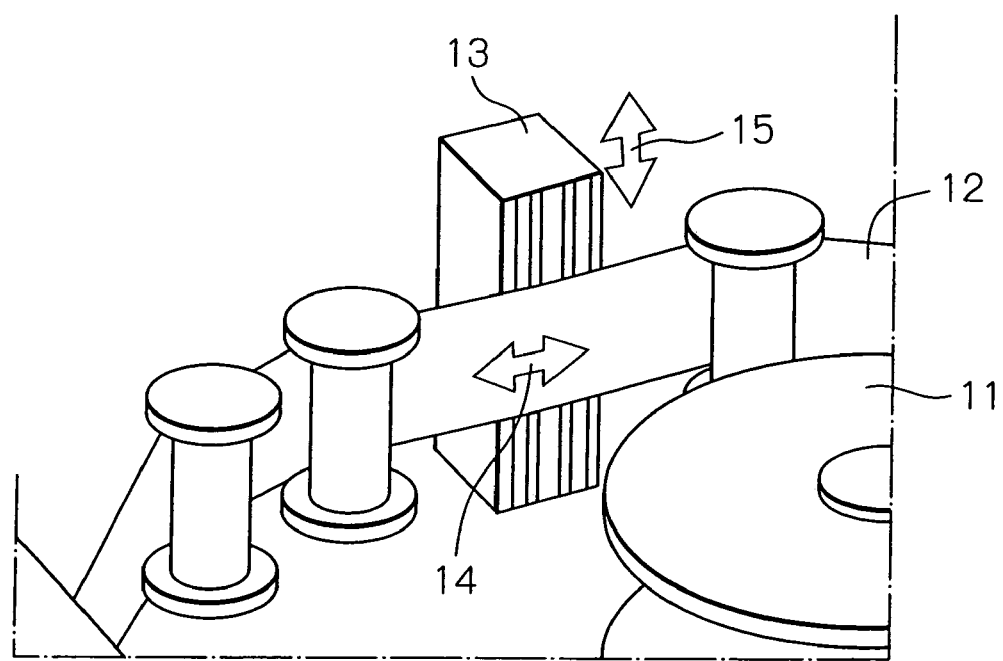
FIG. 2 is an enlarged perspective view illustrating constitution of the multi-channel thin-film magnetic head shown in FIG. 1 and its peripheral portion.

FIG. 1 schematically illustrates constitution of a multi-channel magnetic tape drive apparatus as a one embodiment according to the present invention, and FIG. 2 illustrates constitution of the multi-channel thin-film magnetic head shown in FIG. 1 and its peripheral portion.

In this embodiment, applied is the present invention to a LTO multi-channel magnetic tape drive apparatus of the fourth generation. Of course, the present invention is not limited to the multi-channel magnetic tape drive apparatus of LTO but is applicable to any kind of multi-channel magnetic tape drive apparatus, multi-channel disk drive apparatus and multi-channel drum drive apparatus.

In FIGS. 1 and 2, a reference numeral 10 denotes a tape cartridge with a single reel, 11 denotes a take-up reel for temporarily rewinding a multi-channel magnetic tape 12 drawn out from the tape cartridge 10, and 13 denotes a multi-channel thin-film magnetic head, respectively. The multi-channel thin-film magnetic head 13 can reciprocate in directions or track-width directions 15 perpendicular to reciprocating running directions 14 of the multi-channel magnetic tape 12.

As is known in the art, in LTO, write and read operations are performed to and from the multi-channel magnetic tape 12 of the half-inch width. The multi-channel thin film magnetic head 13 for this purpose is provided with magnetic read head elements of 16 channels, magnetic write head elements of 16 channels and magnetic servo head elements of 2 channels.

Figure 3:
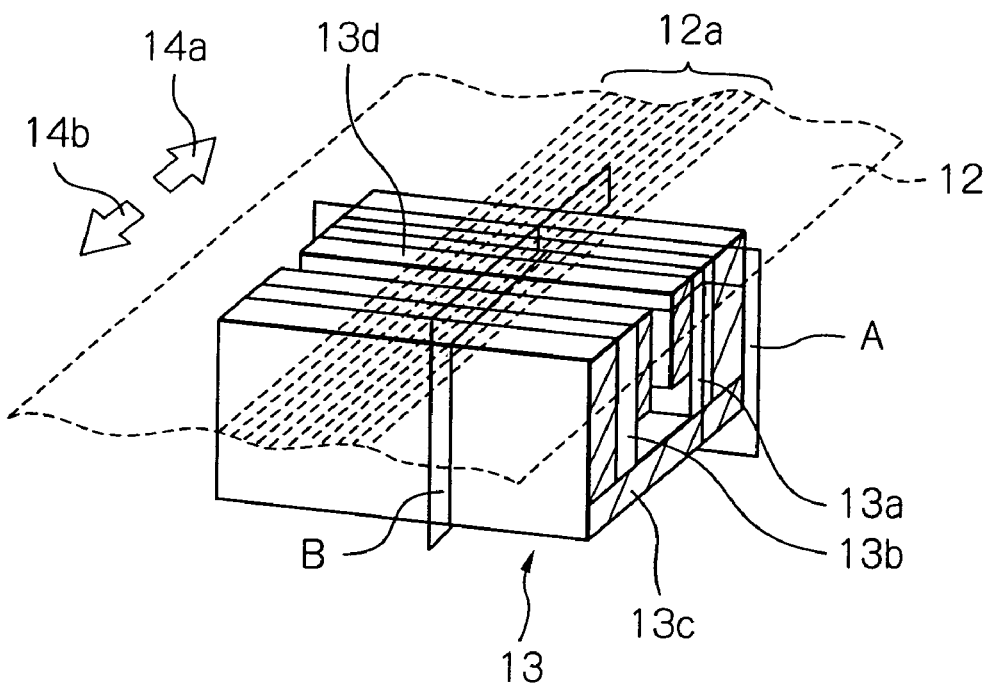
FIG. 3 is a perspective view schematically illustrating relative constitution between the multi-channel thin film magnetic head shown in FIG. 1 and a multi-channel magnetic tape.

FIG. 3 schematically illustrates relative constitution between the multi-channel thin film magnetic head shown in FIG. 1 and a multi-channel magnetic tape.

As shown in the figure, the multi-channel magnetic tape 12 has a plurality of tracks 12a. Also, the multi-channel thin-film magnetic head 13 has a first head section 13a, a second head section 13b and a frame 13c for supporting the both head sections. When performing write and read operations, the magnetic tape 12 moves in direction of arrow 14a or arrow 14b. The write and read operations of data signal with respect to the tracks 12a of the magnetic tape 12 are performed under the state where a tape bearing surface (TBS) 13d of the thin-film magnetic head 13 is in contact with the surface of the moving magnetic tape 12. When the magnetic tape 12 moves to the direction of arrow 14a, for example, read operation is performed in trailing side first head section 13a and write operation is performed in leading side second head section 13b. Whereas when the magnetic tape 12 moves to the opposite direction of arrow 14b, read and written head sections are replaced. In modifications of the present invention, only one of the first and second head sections 13a and 13b may be provided in the thin-film magnetic head 13.

Figure 4:
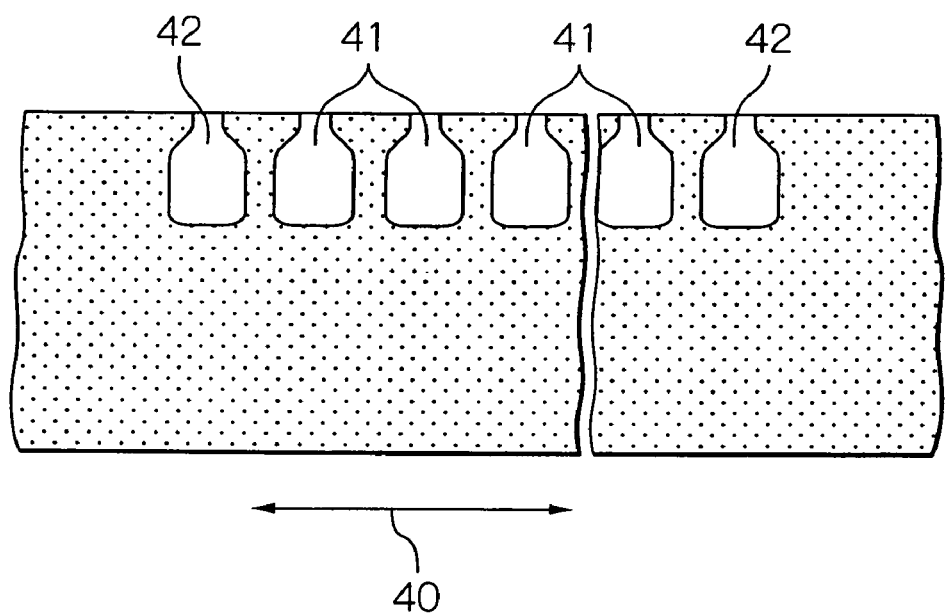
FIG. 4 is a sectional view along a plane section A shown in FIG. 3, illustrating internal configuration of the multi-channel thin film magnetic head shown in FIG. 1.
Figure 5:
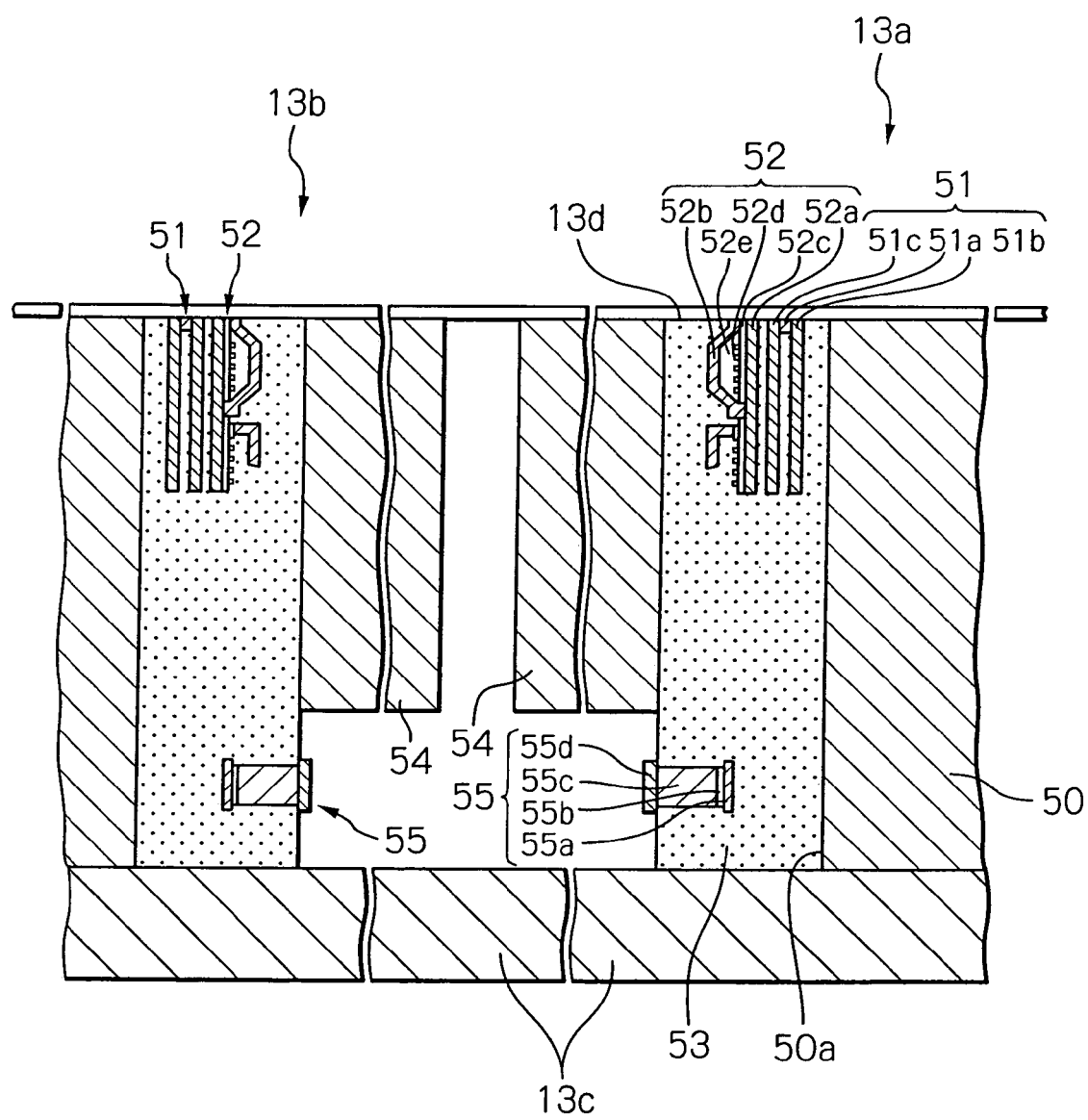
FIG. 5 is a sectional view along a plane section B shown in FIG. 3, illustrating the internal configuration of the multi-channel thin film magnetic head shown in FIG. 1.

FIGS. 4 and 5 illustrate internal configuration of the multi-channel thin film magnetic head shown in FIG. 1. In particular, FIG. 4 shows a section along a plane section A of FIG. 3 and FIG. 5 shows a section along a plane section B of FIG. 3. Because the first head section 13a and the second head section 13b of the thin-film magnetic head 13 are opposed each other in the direction along the tracks and they have the similar constitution to each other, hereinafter explanation will be performed for the first head section 13a only.

As partially shown in FIG. 4, the thin-film magnetic head 13 has magnetic head elements 41 consisting of magnetic read head elements and magnetic write head elements of 16 channels and magnetic servo head elements 42 of 2 channels, aligned along the track-width direction 40 that is perpendicular to a running direction of the magnetic tape 12, formed on an element forming surface 50a of a head substrate 50, which is perpendicular to the TBS 13d.

As shown in FIG. 5, the first section 13a of the thin-film magnetic head 13 has the head substrate 50 made of for example AlTiC ($Al_2O_3$—TiC), GMR read head elements 51 formed on the element forming surface 50a for reading out data signal, inductive write head elements 52 formed just on the GMR read head elements 51 for writing the data signal, a protection layer 53 formed on the element forming surface 50a to cover these GMR read head elements 51 and inductive write head elements 52, a closure 54 made of for example AlTiC ($Al_2O_3$—TiC) and adhered to the protection layer 53, and a plurality of terminal electrodes 55 formed on an exposed area of an upper surface of the protection layer 53, to which area no closure 54 is adhered.

It should be noted that, in the section shown in FIG. 5, only one magnetic head element consisting of the GMR read head element 51 and the inductive write head element 52 is revealed for each of the first and second head sections 13a and 13b.

The plurality of GMR read head elements 51 are electrically connected to the plurality of terminal electrodes 55, respectively. Also, one ends of each GMR read head element 51 and each inductive write head element 52 are arranged to reach the TBS 13d and to come in contact with the relatively moving magnetic tape 12. Therefore, during writing operation, the inductive write head elements 52 apply signal magnetic fields to the respective tracks of the moving magnetic tape 12 to write data thereto, and during read operation, the GMR read head elements 51 receive signal magnetic fields from the respective tracks of the moving magnetic tape 12 to read data there from.

Each of the GMR read head elements 51 includes, as shown in FIG. 5, a GMR multi-layered structure 51a, and a pair of a lower shield layer 51b and an upper shield layer 51c arranged to sandwich the GMR multi-layered structure 51a. The lower shield layer 51b and the upper shield layer 51c prevent the GMR multi-layered structure 51a from receiving external magnetic field or noise. Each of these lower shield layer 51b and upper shield layer 51c is formed, by using for example a frame plating method or a sputtering method, from a single layer or multilayer of soft magnetic materials such as FeSiAl (Sendust), NiFe (permalloy), CoFeNi, CoFe, FeN, FeZrN or CoZrTaCr, with a thickness of about 0.5-3.0 μm.

The GMR multi-layered structure 51a constitutes a magnetic sensitivity portion for detecting a signal magnetic field by utilizing the giant magnetoresistive effect. Instead of the GMR multi-layered structure 51a, an anisotropic magnetoresistive effect (AMR) structure utilizing anisotropic magnetoresistive effect or a tunneling magnetoresistive effect (TMR) multi-layered structure utilizing tunneling magnetoresistive effect may be used. In case of the GMR multi-layered structure, either current in plane (CIP) type GMR multi-layered structure or current perpendicular to plane (CPP) type GMR multi-layered structure may be adopted. The GMR multi-layered structure 51a will receive a signal magnetic field from each track 12a of the magnetic tape 12 with high sensitivity. In case that the GMR multi-layered structure 51a is the CPP-GMR multi-layered structure or that a TMR multi-layered structure is used instead of the GMR multi-layered structure, the lower shield layer 51b and the upper shield layer 51c serve as electrodes. On the other hand, in case that the GMR multi-layered structure 51a is the CIP-GMR multi-layered structure or that an AMR structure is used in stead of the GMR multi-layered structure, it is provided with insulation layers between the CIP-GMR multi-layered structure or the AMR structure and the lower and upper shield layers 51b and 51c, respectively and also it is provided with MR lead layers electrically connected to the CIP-GMR multi-layered structure or the AMR structure.

Each of the inductive write head elements 52 includes, as shown in FIG. 5, a lower magnetic pole layer 52a, an upper magnetic pole layer 52b, a write gap layer 52c with an end section near the TBS 13d, sandwiched between the lower magnetic pole layer 52a and the upper magnetic pole layer 52b near the TBS 13d, a write coil layer 52d formed to pass through at each turn between at least the lower magnetic pole layer 52a and the upper magnetic pole layer 52b, and a coil insulating layer 52e for insulating the write coil layer 52d from the lower magnetic pole layer 52a and the upper magnetic pole layer 52b.

The lower magnetic pole layer 52a and the upper magnetic pole layer 52b function as a magnetic path of magnetic flux produced from the write coil layer 52d and also sandwich by their end sections the TBS side end section of the write gap layer 52c. The write operation is performed by means of leakage flux output from the sandwiched end section of the write gap layer 52c. In the figure, it is depicted that the write coil layer 52d has a single layer structure. However, in modifications, the write coil layer may have a multi-layered structure or a helical coil structure. Also, in modifications, a single common magnetic layer may serve as both the upper shield layer 51c of the GMR read head element 51 and the lower magnetic pole layer 52a of the inductive write head element 52 laminated on the GMR read head element 51.

The lower magnetic pole layer 52a is formed, by using for example a frame plating method or a sputtering method, from a single layer or multilayer of soft magnetic materials such as NiFe, CoFeNi, CoFe, FeN, FeZrN or CoZrTaCr, with a thickness of about 0.5-3.0 µm. The write gap layer 52c is formed, by using for example a sputtering method or a chemical vapor deposition (CVD) method, from a nonmagnetic insulating material such as $Al_2O_3$ (alumina), $SiO_2$ (silicon dioxide), AlN (aluminum nitride) or DLC, with a thickness of about 0.01-0.05 µm. The write coil layer 52d is formed, by using for example a frame plating method or a sputtering method, from a conductive material such as Cu, with a thickness of about 0.5-5.0 µm. The coil insulation layer 52e is formed, by using for example a photolithography method, from a resin insulation material cured by heating, such as a novolac photoresist, with a thickness of about 0.7-7.0 µm. The upper magnetic pole layer 51c is formed, by using for example a frame plating method or a sputtering method, from a single layer or multilayer of soft magnetic materials such as NiFe, CoFeNi, CoFe, FeN, FeZrN or CoZrTaCr, with a thickness of about 0.5-3.0 µm. Also, the protection layer 53 is formed, by using for example a sputtering method or a CVD method, from a nonmagnetic insulating material such as $Al_2O_3$, $SiO_2$, AlN or DLC.

Each of the terminal electrodes 55 includes a drawing electrode 55a, an electrode film 55b, a bump 55c and a pad 55d. The drawing electrodes 55a are electrically connected to lead lines from the GMR read head element 51 and from the inductive write head element 52. On each drawing electrode 55a, the electrode film 55b having conductivity is laminated, and the bump 55c is formed on the electrode film 55b by plating using this film 55b as an electrode for plating. The electrode film 55b and the bump 55c are made of a conductive material such as Cu. A thickness of the electrode film 55b is for example about 10-200 nm, and a thickness of the bump 55c is for example about 5-30 µm. A top end of the bump 55c is exposed from the top surface of the protection layer 53, and the pad 55d is laminated on this top end of the bump 55c.

Figure 6:
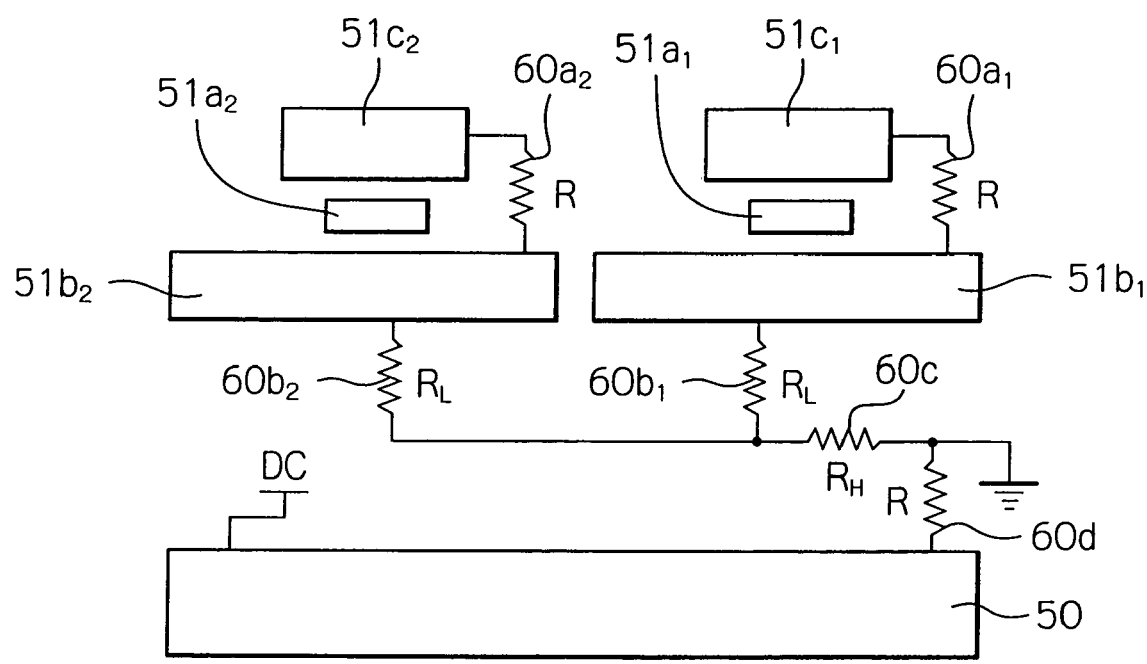
FIG. 6 is an equivalent circuit diagram illustrating an electrical constitution of a section with protection function from electrical charge in the multi-channel thin film magnetic head shown in FIG. 1.

FIG. 6 shows an equivalent circuit diagram illustrating an electrical constitution of a section with protection function from electrical charge in the multi-channel thin film magnetic head shown in FIG. 1. As aforementioned, the multi-channel thin film magnetic head 13 in this embodiment includes the magnetic head element 41 consisting of magnetic read head elements of 16 channels and magnetic write head elements of 16 channels and magnetic servo head elements 42 of 2 channels. However, in FIG. 6, indicated are only GMR read head elements 51 of 2 channels as an example.

In the figure, reference numerals $51b_1$ and $51c_1$ denote a lower shield layer and an upper shield layer in a GMR read head element of one channel, and $51a_1$ denotes a GMR multi-layered structure stacked between the lower shield layer $51b_1$ and the upper shield layer $51c_1$, respectively. Also, reference numerals $51b_2$ and $51c_2$ denote a lower shield layer and an upper shield layer in a GMR read head element of another channel adjacent to the above-mentioned channel, and $51a_2$ denotes a GMR multi-layered structure stacked between the lower shield layer $51b_2$ and the upper shield layer $51c_2$, respectively.

In the GMR read head element of one channel, the lower shield layer $51b_1$ and the upper shields layer $51c_1$ are electrically connected to each other through a resistor $60a_1$ with a resistance R of for example about 10 kΩ. The lower shield layer $51b_1$ is grounded through a resistor $60b_1$ with a low resistance value $R_L$ of for example about 0.5 kΩ, and a resistor $60c$ with a high resistance value $R_H$ of for example about 9.5 kΩ. The resistor $60c$ is common for all head elements, and these resistors $60b_1$ and $60c$ are serially connected each other. The sum of the low resistance value $R_L$ and the high resistance value $R_H$ are approximately equal to the resistance value R. In other words, it is set in $R_L+R_H \cong R$.

In the GMR read head element of the adjacent another channel, the lower shield layer $51b_2$ and the upper shields layer $51c_2$ are electrically connected to each other through a resistor $60a_2$ with the resistance R of for example about 10 kΩ. The lower shield layer $51b_2$ is grounded through a resistor $60b_2$ with the low resistance value $R_L$ of for example about 0.5 kΩ, and the resistor $60c$ common for all head elements, with the high resistance value $R_H$ of for example about 9.5 kΩ. These resistors $60b_2$ and $60c$ are serially connected each other. The sum of the low resistance value $R_L$ and the high resistance value $R_H$ are approximately equal to the resistance value R. In other words, it is set in $R_L+R_H \cong R$.

In this embodiment, when the lower shield layer is grounded through a resistor with the resistance value R, this resistor with the resistance value R is divided in two, that is a resistor with the low resistance value $R_L$ and a resistor with the high resistance value $R_H$. The resistor with the low resistance value $R_L$ is prepared for each head element and connected to the lower shield layer of each head element. One end of the resistor with the high resistance value $R_H$, which is common for all the head elements, is connected to the resistor with the low resistance value $R_L$ for each head element and the other end of the resistor with the high resistance value $R_H$ is grounded.

Since all the GMR read head elements are grounded via the high resistance R ($R \cong R_L + R_H$, for example about 10 k$\Omega$), electrical charge in the head elements is gradually discharged to the ground. Also, because the GMR read head elements have the same load to the ground each other and have the same load to the substrate each other, even if electric charge concentrates onto one GMR read head element, the charge will be released to the ground without making any short circuit. Particularly, since the adjacent GMR read head elements are connected each other through a low resistance of $2R_L$ of for example about 1.0 k$\Omega$, no potential difference of a predetermined value or more will be produced between these adjacent read head elements. Thus, flowing of discharge current from one GMR read head element to another GMR read head element adjacent thereto will never occur. Furthermore, since the GMR read head elements are not connected each other in resistance zero but connected each other through a low resistance of $2R_L$, no noise will be scattered from one GMR read head element to another GMR read head element.

The substrate 50 is grounded through a resistor 60d of the resistance value R of for example about 10 k$\Omega$. Because the substrate 50 is grounded through resistance value R ($R \cong R_L + R_H$, for example about 10 k$\Omega$) that will invite slow discharge, the charge in the substrate is gradually released to the ground. Furthermore, the substrate 50 is pulled up to a predetermined potential such as for example about DC +0.25 V. In case of a thin-film magnetic head in a magnetic disk drive apparatus, the substrate of the thin-film head will be directly grounded. However, in case of a thin-film magnetic head in a multi-channel magnetic tape drive apparatus, the substrate of the thin-film head is not directly grounded but grounded through a resistor and the predetermined potential such as for example about 0.25 V is applied to the substrate. Since the operation potential of the GMR read head elements is about 0.25 V (MR resistance is about 50$\Omega$ and sense current is about 5 mA), it is possible therefore to set the potential of the substrate equal to or higher than the operation potential of the GMR read head elements. As a result, no electrostatic charge will flow into the GMR read head elements, and thus it is possible to prevent noise from occurring and dust from accumulating.

Figure 7:
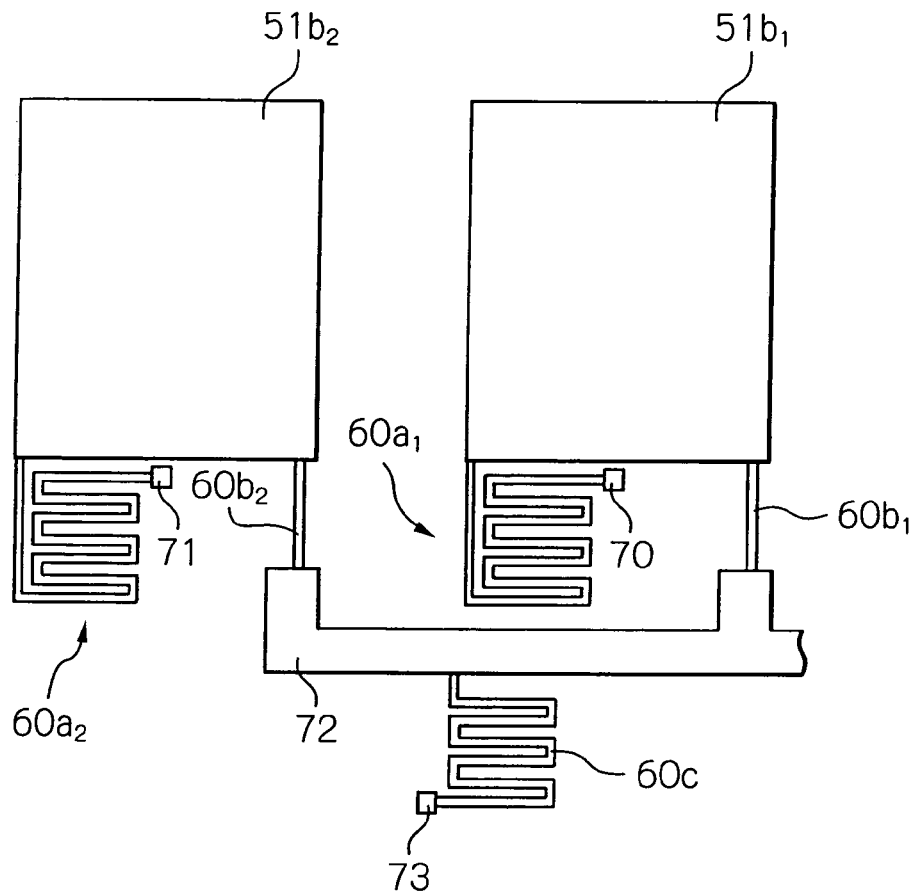
FIG. 7 is a plane view schematically illustrating an example that implements some resistances shown in FIG. 6, in the multi-channel thin film magnetic head shown in FIG. 1.
Figure 8:
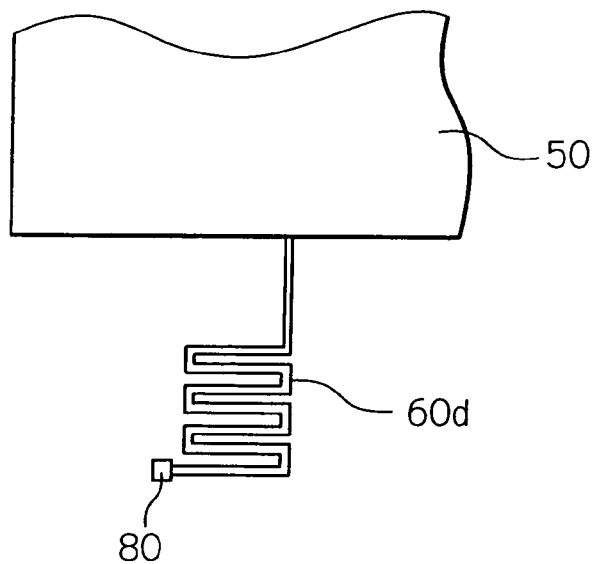
FIG. 8 is a plane view schematically illustrating an example that implements another resistances shown in FIG. 6, in the multi-channel thin film magnetic head shown in FIG. 1.

FIGS. 7 and 8 schematically illustrate an example that implements some resistances shown in FIG. 6, in the multi-channel thin film magnetic head 13 in this embodiment. In these figures, in order to make easily understanding, only fundamental elements necessary for explanation are illustrated.

As shown in FIG. 7, the resistor $60a_1$ of the resistance value R of for example about 10 k$\Omega$ for connecting the lower shield layer $51b_1$ and the upper shield layer $51c_1$ to each other consists of a resistive layer in a strip shape, made of tantalum (Ta) or tungsten (W). One end of this strip-shaped resistive layer is connected to the lower shield layer $51b_1$, and the other end thereof is connected to a bump 70 connected to the upper shield layer $51c_1$ that is not shown in this figure. Also, the resistor $60a_2$ of the resistance value R of for example about 10 k$\Omega$ for connecting the lower shield layer $51b_2$ and the upper shield layer $51c_2$ to each other consists of a resistive layer in a strip shape, made of Ta or W. One end of this strip-shaped resistive layer is connected to the lower shield layer $51b_2$, and the other end thereof is connected to a bump 71 connected to the upper shield layer $51c_2$ that is not shown in this figure.

On the other hand, the resistor $60b_1$ of the low resistance value $R_L$ of for example about 0.5 k$\Omega$ connected to the lower shield layer $51b_1$ consists of a resistive layer in a strip shape, made of Ta or W. One end of this strip-shaped resistive layer is connected to the lower shield layer $51b_1$, and the other end thereof is connected to a conductive layer 72. The resistor $60b_2$ of the low resistance value $R_L$ of for example about 0.5 k$\Omega$ connected to the lower shield layer $51b_2$ consists of a resistive layer in a strip shape, made of Ta or W. One end of this strip-shaped resistive layer is connected to the lower shield layer $51b_2$, and the other end thereof is connected to the conductive layer 72.

The resistor 60c of the high resistance value $R_H$ of for example about 9.5 k$\Omega$, which is common for all the GMR read head elements consists of a resistive layer in a strip shape, made of Ta or W. One end of this strip-shaped resistive layer is connected to the conductive layer 72, and the other end thereof is connected to a bump 73 that is connected to the ground of a head preamplifier.

As shown in FIG. 8, the resistor 60d of the resistance value R of for example about 10 k$\Omega$ consists of a resistive layer in a strip shape, made of Ta or W. One end of this strip-shaped resistive layer is connected to the substrate 50, and the other end thereof is connected to the bump 73 that is connected to the ground of the head preamplifier. The substrate 50 is connected to a voltage supply of the head amplifier through a bump not shown, and thus pulled up to the predetermined potential such as for example about DC +0.25 V.

Figure 9A:
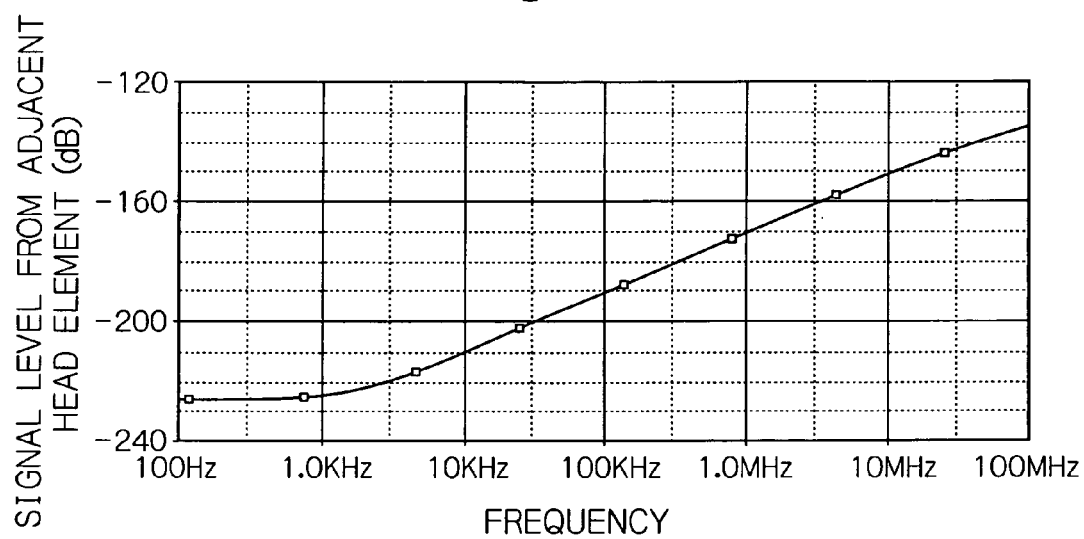
FIGS. 9a and 9b are characteristic graphs illustrating simulated influence of electrical charge between adjacent read head elements in the multi-channel thin film magnetic head.
Figure 9B:
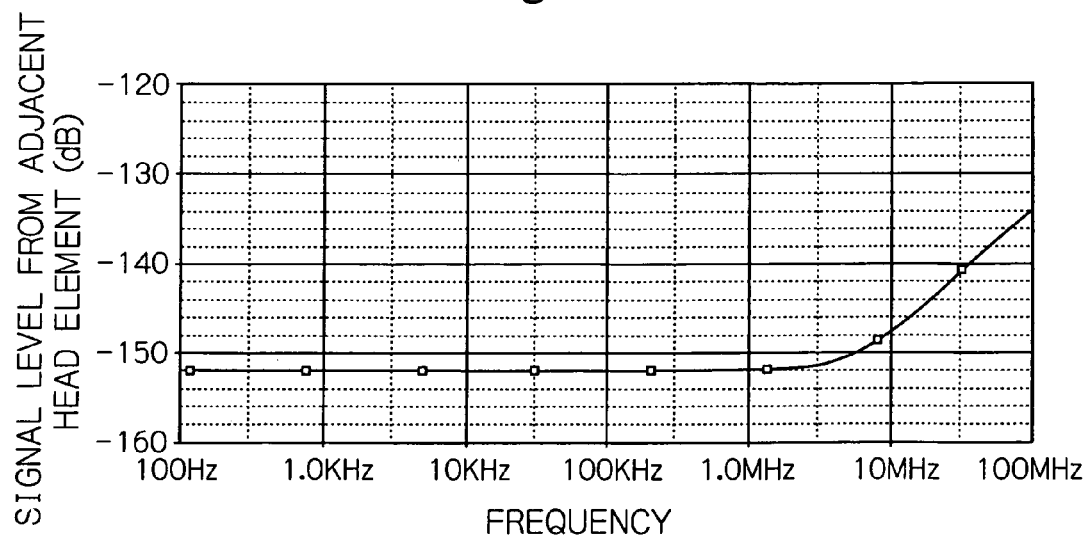

FIGS. 9a and 9b illustrate simulated influence of electrical charge between adjacent read head elements in the multi-channel thin film magnetic head.

In these figures, the lateral axis represents frequency, and the longitudinal axis represents a level (dB) of a signal applied from an adjacent read head element. Particularly, FIG. 9a indicates characteristics according to the prior art wherein a lower shield layer of each read head element is grounded via a resistor with a resistance of R=10 k$\Omega$, and FIG. 9b indicates characteristics according to the present invention wherein a lower shield layer of each read head element is grounded via a serial connection of a resistor for each head element with a resistance of $R_L$=0.5 k$\Omega$ and a common resistor with a resistance of $R_H$=9.5 k$\Omega$, respectively.

As shown in FIG. 9a, according to the prior art, a signal applied from the adjacent read head element increases and thus influence of the electric charge between the adjacent read head elements increases, in a frequency region higher than 1 kHz. In contrast, as shown in FIG. 9b, according to the present invention, a signal applied from the adjacent read head element does not increase but is kept constant and thus influence of the electric charge between the adjacent read head elements is small, in a frequency region up to several MHz.

As aforementioned, according to this embodiment, since all the GMR read head elements are grounded via the resistance R of for example about 10 k$\Omega$, electrical charge in the head elements is gradually discharged to the ground. Also, because the GMR read head elements have the same load to the ground each other and have the same load to the substrate each other, even if electric charge concentrates onto one GMR read head element, the charge will be released to the ground without making any short circuit. Particularly, since the adjacent GMR read head elements are connected each other through a low resistance of $2R_L$ of for example about 1.0 k$\Omega$, no potential difference of a predetermined value or more will be produced between these adjacent read head elements.

Thus, flowing of discharge current from one GMR read head element to another GMR read head element adjacent thereto will never occur. Further, since the GMR read head elements are not connected each other in resistance zero but connected each other through a low resistance of $2R_L$, no noise will be scattered from one GMR read head element to another GMR read head element. Still further, because the substrate is grounded through resistance value R of for example about 10 kΩ that will invite slow discharge, the charge in the substrate is gradually released to the ground. Furthermore, the substrate is not directly grounded but grounded through a resistor and the predetermined potential such as for example about 0.25 V is applied to the substrate. Since the operation potential of the GMR read head elements is about 0.25 V, it is possible therefore to set the potential of the substrate equal to or higher than the operation potential of the GMR read head elements. As a result, no electrostatic charge will flow into the GMR read head elements, and thus it is possible to prevent noise from occurring and dust from accumulating.

In the aforementioned embodiment, the lower shield layer is grounded through a resistor. However, in modifications, the upper shield layer may be grounded through a resistor.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A multi-channel thin-film magnetic head comprising:
a substrate;
a plurality of magnetoresistive effect read head elements, each including a lower magnetic shield layer, an upper magnetic shield layer, and a magnetoresistive effect layer arranged between said lower magnetic shield layer and said upper magnetic shield layer;
a plurality of first resistive elements, each having a first resistance value, first ends of said plurality of first resistive elements being connected to said lower magnetic shield layers or said upper magnetic shield layers of said plurality of magnetoresistive effect read head elements, respectively; and
a second resistive element having a second resistance value that is higher than said first resistance value, a first end of said second resistive element being commonly connected to second ends of said plurality of first resistive elements, a second end of said second resistive element being grounded.

2. The multi-channel thin-film magnetic head as claimed in claim 1, wherein said substrate is grounded through a third resistive element having a third resistance value that corresponds to a sum of said first resistance value and said second resistance value.

3. The multi-channel thin-film magnetic head as claimed in claim 1, wherein said lower magnetic shield layer and said upper magnetic shield layer of each of said plurality of magnetoresistive effect read head elements are connected to each other through a third resistive element with a third resistance value that corresponds to a sum of said first resistance value and said second resistance value.

4. The multi-channel thin-film magnetic head as claimed in claim 1, wherein each of said plurality of magnetoresistive effect read head elements comprises a giant magnetoresistive effect read head element.

5. The multi-channel thin-film magnetic head as claimed in claim 1, wherein said multi-channel thin-film magnetic head further comprises a plurality of inductive write head elements.

6. A multi-channel magnetic tape drive apparatus including a multi-channel thin-film magnetic head, a magnetic tape facing to said multi-channel thin-film magnetic head, and a drive system for relatively moving said magnetic tape and said multi-channel thin-film magnetic head,
said multi-channel thin-film magnetic head comprising:
a substrate;
a plurality of magnetoresistive effect read head elements, each including a lower magnetic shield layer, an upper magnetic shield layer, and a magnetoresistive effect layer arranged between said lower magnetic shield layer and said upper magnetic shield layer;
a plurality of first resistive elements, each having a first resistance value, first ends of said plurality of first resistive elements being connected to said lower magnetic shield layers or said upper magnetic shield layers of said plurality of magnetoresistive effect read head elements, respectively; and
a second resistive element having a second resistance value that is higher than said first resistance value, a first end of said second resistive element being commonly connected to second ends of said plurality of first resistive elements, a second end of said second resistive element being grounded.

7. The multi-channel magnetic tape drive apparatus as claimed in claim 6, wherein said substrate is grounded through a third resistive element having a third resistance value that corresponds to a sum of said first resistance value and said second resistance value.

8. The multi-channel magnetic tape drive apparatus as claimed in claim 6, wherein said lower magnetic shield layer and said upper magnetic shield layer of each of said plurality of magnetoresistive effect read head elements are connected to each other through a third resistive element with a third resistance value that corresponds to a sum of said first resistance value and said second resistance value.

9. The multi-channel magnetic tape drive apparatus as claimed in claim 6, wherein each of said plurality of magnetoresistive effect read head elements comprises a giant magnetoresistive effect read head element.

10. The multi-channel magnetic tape drive apparatus as claimed in claim 6, wherein said multi-channel thin-film magnetic head further comprises a plurality of inductive write head elements.

* * * * *